United States Patent
Baumgartner et al.

(10) Patent No.: US 7,111,911 B2
(45) Date of Patent: Sep. 26, 2006

(54) WHEEL HUB

(75) Inventors: Johann Baumgartner, Moosburg (DE); Wolfgang Pahle, Heilbronn (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 158 days.

(21) Appl. No.: 10/475,679

(22) PCT Filed: Apr. 26, 2002

(86) PCT No.: PCT/EP02/04634

§ 371 (c)(1), (2), (4) Date: May 11, 2004

(87) PCT Pub. No.: WO02/087901

PCT Pub. Date: Nov. 7, 2002

(65) Prior Publication Data

US 2004/0207249 A1  Oct. 21, 2004

(30) Foreign Application Priority Data

Apr. 30, 2001 (DE) .............................. 101 21 124
Jul. 17, 2001 (DE) .............................. 101 33 985

(51) Int. Cl.
- *B60B 27/00* (2006.01)
- *B60B 19/00* (2006.01)
- *F16D 65/12* (2006.01)

(52) U.S. Cl. ............... 301/105.1; 301/6.1; 188/218 XL

(58) Field of Classification Search ................. 301/6.1, 301/6.3, 6.5, 6.8, 105.1, 35.621; 188/18 A, 188/218 XL, 218 R
See application file for complete search history.

(56) References Cited

U.S. PATENT DOCUMENTS

| 2,781,231 | A | * | 2/1957 | Black ........................ 301/105.1 |
| 5,281,004 | A | | 1/1994 | O'Leary, Jr. .............. 301/105.1 |
| 5,921,633 | A | * | 7/1999 | Neibling et al. ............ 301/6.1 |
| 6,076,896 | A | * | 6/2000 | Bertetti et al. ........... 301/105.1 |
| 6,257,678 | B1 | * | 7/2001 | Brookey et al. ......... 301/105.1 |
| 6,564,913 | B1 | * | 5/2003 | Baumgartner et al. ..................... 188/218 XL |
| 6,612,657 | B1 | * | 9/2003 | Fakhoury et al. ........ 301/105.1 |
| 6,880,682 | B1 | * | 4/2005 | Gotti et al. ........... 188/218 XL |

FOREIGN PATENT DOCUMENTS

| DE | 19537808 A1 | 4/1997 |
| DE | 19628331 A1 | 1/1998 |

* cited by examiner

*Primary Examiner*—S. Joseph Morano
*Assistant Examiner*—Jason Bellinger
(74) *Attorney, Agent, or Firm*—Crowell & Moring LLP

(57) ABSTRACT

A wheel hub, especially a wheel hub for commercial vehicles, for receiving a brake disk, in which a neck section which is formed on the wheel flange for receiving the brake disk, the neck section being provided with a surface structure, preferably ribs, which increases the amount of heat given off to the environment. There may also be provided ducts between the ribs to permit cooling air to pass between the wheel flange and the brake disk to further increase the amount of heat given off to the environment.

14 Claims, 9 Drawing Sheets

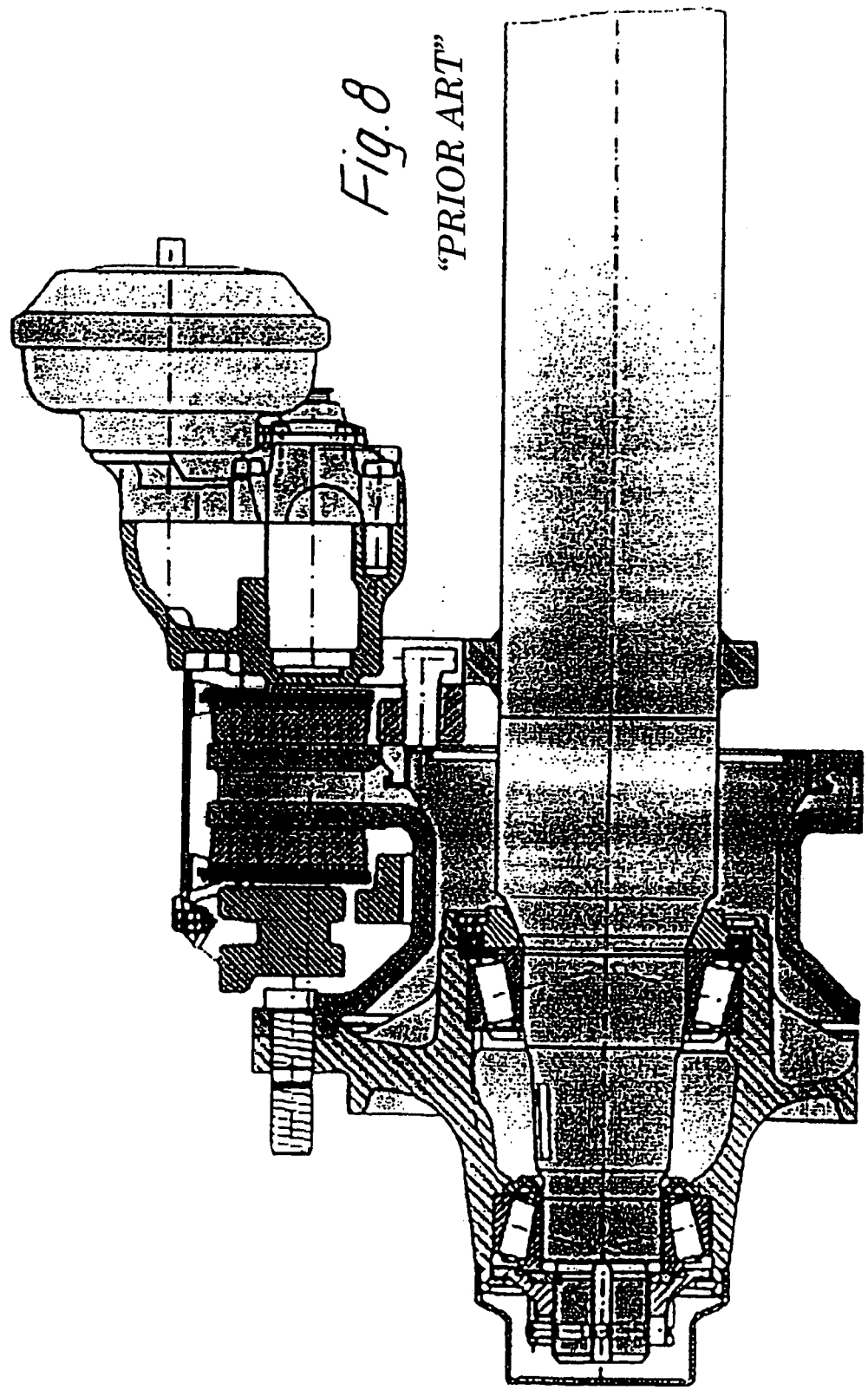
Fig. 8 "PRIOR ART"

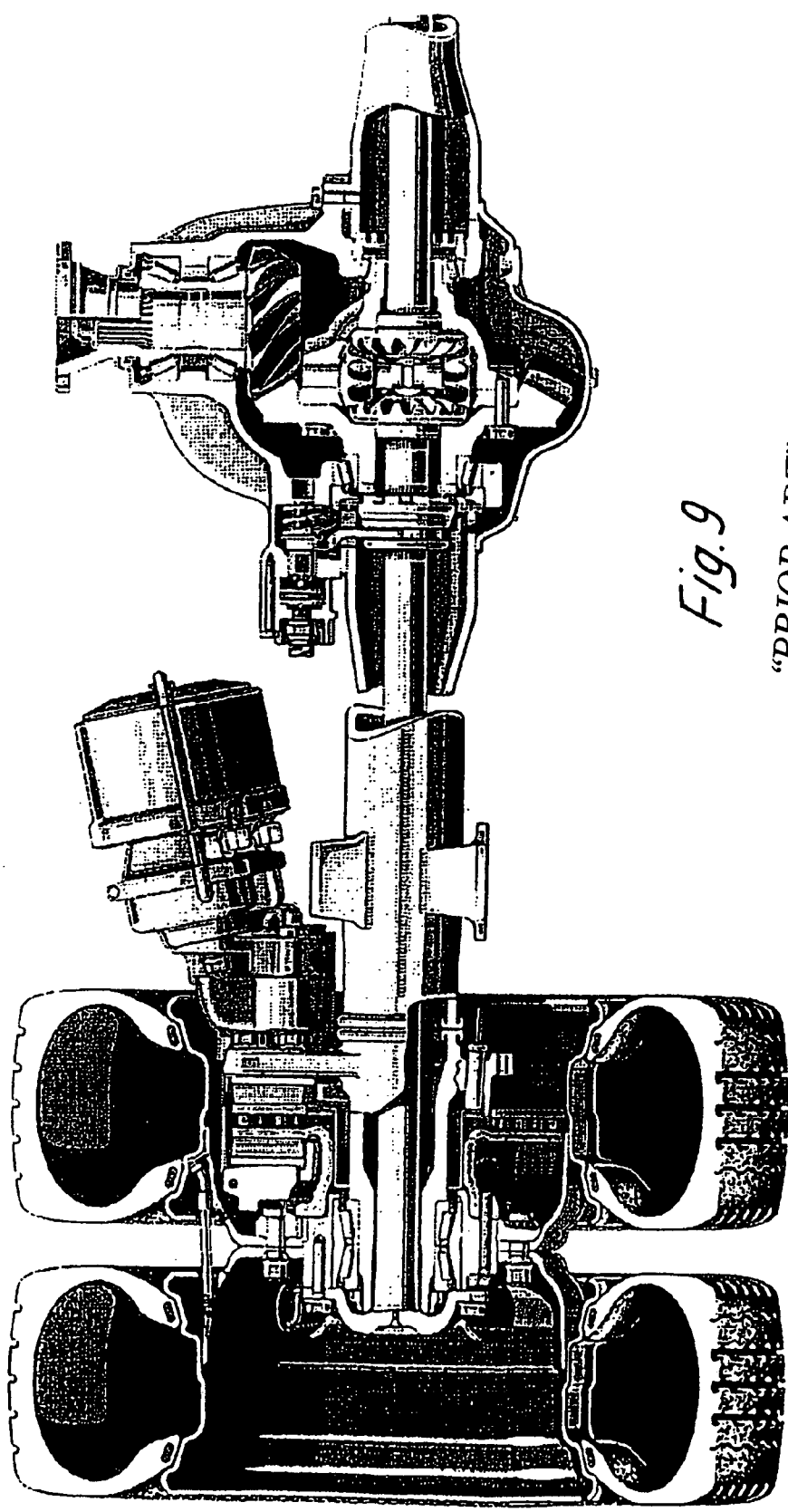
Fig. 9 "PRIOR ART"

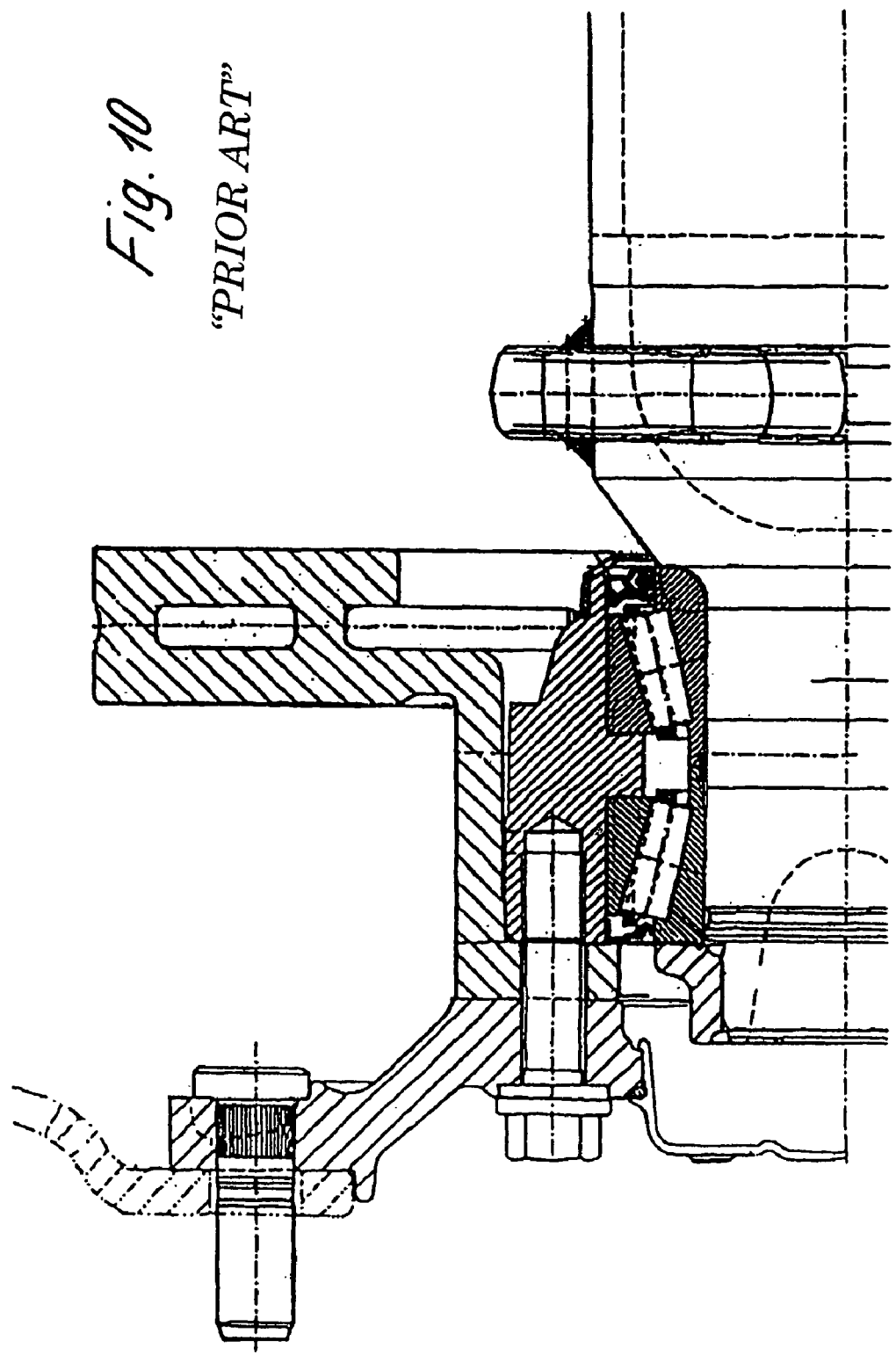
Fig. 10 "PRIOR ART"

"PRIOR ART"

WHEEL HUB

The present application is a continuation of International Patent Application No. PCT/EP02/04634, filed Apr. 26, 2002, designating the United States of America and published in German as WO 02/087901, the entire disclosure of which is incorporated herein by reference. Priority is claimed based on Federal Republic of Germany Patent Application No. 101 21 124.4, filed Apr. 30, 2001.

BACKGROUND AND SUMMARY OF THE INVENTION

The invention relates to a wheel hub for receiving a brake disk, particularly a wheel hub for commercial vehicles, having a hub body which is molded to the wheel flange and has a neck section designed for receiving the brake disk.

Wheel hubs of this type are used on powered axles and dead axles of road vehicles, particularly of commercial vehicles, having disk brakes.

Such wheel hubs have the problem of thermal stress to the wheel bearings and the lubricant as a result of a heat development in the wheel bearing as well as, under certain circumstances, also because of the heat transmission from the brake disk to the hub body.

In the case of a high loading of the vehicle, considerable heat is necessarily developed in the wheel bearing because of the resulting friction in the bearing. The heat development may be increased by the heating-up of the brake disk during brakings. Since, for the purpose of the braking torque transmission, the brake disk is mechanically (in one part or in several parts) connected with the wheel hub, a portion of the heat generated in the brake disk is transmitted to the wheel hub. The heat development in the wheel bearing, like the heat development in the brake disk, is approximately proportional to the loading condition of the vehicle or the loading of the respective wheel. In the case of a high loading of the vehicle—connected with a braking-intensive driving method, for example, during drives in mountainous regions—the occurring thermal stressing of the wheel hub may be relatively high.

According to the type of construction of the brake disk and the type of hub linkage, different conditions exist for the thermal stressing and cooling of the wheel hub.

FIGS. 8 to 11 show different wheel hub/brake disk combinations.

FIG. 8 shows a wheel hub/brake disk combination in which, for the purpose of a fastening to the wheel hub, the brake disk is provided with a neck and a flange and, by way of this flange, is connected with the wheel hub by means of the wheel bolts which are also used for fastening the vehicle wheel to the wheel hub. In this type of construction, only a low heat transmission takes place by a direct heat conduction from the brake disk to the wheel hub bearing area because the fastening and the resulting heat-conducting contact of the brake disk onto wheel hub takes place at the outer circumference of the latter.

In contrast, the enveloping of the hub body by the brake disk neck is less optimal, which enveloping, on the one hand, results in a thermal radiation from the brake disk neck to the surface of the hub body and, on the other hand, hinders the dissipating of the frictional heat occurring in the wheel bearing to the environment.

FIG. 9 shows a similar hub/brake disk combination in which the brake disk is fastened on the wheel hub by means of a separate screw flange. The heat transmission and heat dissipation conditions correspond essentially to FIG. 8.

FIG. 10 shows another two-part wheel hub/brake disk combination, in which the wheel hub is divided into a hub part (neck section) accommodating the wheel bearing and into the wheel flange carrying the vehicle wheel, and the brake disk equipped with a neck and an inward-pulled ring flange is clamped in between the hub part and the wheel flange by a screwing-together of these two parts. In the case of this type of construction, in addition to the limited heat dissipation by way of the surface area of the hub because of the enveloping by the brake disk neck, there is the problem that the hub part is separated from the wheel flange by the brake disk clamped in-between, and the heat dissipation capacity of the wheel flange is therefore not utilized for the hub.

FIG. 11 shows a wheel hub/brake disk combination of the initially mentioned type in which an internally ventilated brake disk with two friction rings, by way of a non-circular profile, for example, a toothing, generated on the inside diameter, engages in an essentially oppositely designed contour on the circumference of the wheel hub. The heat-conducting contact of the brake disk with respect to the wheel hub is preferably interrupted by heat-insulating intermediate elements in order to thus reduce the thermal stressing of the wheel hub. In this case, the brake disk may be detachably connected with the hub body or may be joined onto the wheel hub in an undetachable manner, for example, by means of a composite casting method. Since, as a result of the heat-insulating intermediate elements, only a slight heat dissipation takes place from the brake disk by way of the wheel hub, such brake disks have slightly higher operating temperatures than the above-described neck-type and cup-type brake disks. On the other hand, the enveloping of the hub body by the (non-existing) brake disk neck does not take place, whereby the heat dissipation from the wheel hub is improved.

In contrast to this heat-dissipating construction, which is satisfactory per se, it is an object of the invention to further develop the wheel hub such that the releasing of heat to the environment is improved, particularly during braking.

According to the invention, the neck section is provided with a surface structure which increases the heat discharge to the environment—preferably relative to a uniform or tapering or widening cylinder surface—in the axial area adjoining the area for the placing of the brake disk. As a result of this simple and cost-effective measure, the heat discharge of the wheel hub to the ambient air can be effectively increased. The invention is particularly suitable for a two-part embodiment of the wheel hub and the brake disk, in which case the brake disk is placed upon the wheel hub. Summarizing, the invention implements a wheel hub for a wheel hub/brake disk combination with, in one embodiment, a flat, tooth-linked brake disk, in the case of which the exposed wheel hub surface is utilized in the sense of an improved heat dissipation from the wheel hub and the brake disk. In this manner, a thermal overloading of the wheel hub is effectively avoided.

In the axial area adjoining the area for the placing of the brake disk, the neck section is preferably provided with ribs. With respect to their manufacturing, these "cooling ribs" and be implemented in a simple manner in the case of a cast hub and provide a good heat dissipation. For a further improvement of the cooling of the wheel hub, ducts are preferably constructed between the axially extending ribs, in which ducts an air flow is formed during the rotating of the wheel hub on the axle. The ribs and the ducts preferably extend to a wheel flange molded to the neck section.

The ribs preferably extend on the outer circumference of the neck section essentially in the axial direction, so that the ventilating effect is optimized. It is also conceivable to mutually connect the axial ribs by additional ribs extending in the circumferential direction in order to increase the rigidity of the wheel hub in a simple manner and thereby further simplify the use of light metals. The ribs extending in the circumferential direction, if required, may in turn have openings penetrating them for improving the air supply.

As a result of the forced ventilation of the hub body with cool fresh air from the exterior side of the vehicle wheel, an intensive heat dissipation is achieved from the wheel hub as well as additionally a cooling of the brake disk. As a result, not only the effects of the heat transmission from the brake disk to the wheel hub can be compensated, but the frictional heat forming in the wheel bearing can also be efficiently dissipated from the wheel hub and thus heats up the wheel bearing less intensively. As a result of the cooling of the wheel hub, even the use of light-weight materials as the wheel hub material becomes conceivable. In particular, it is also permitted by means of the invention to use a light-weight material, such as a light metal, for producing the wheel hub because the wheel hub is heated up less intensively. As a result of the selected rib structure, the hub body is reinforced which, in a supplementary manner, simplifies the use of light-weight materials. However, it is also conceivable for the wheel hub to consist of cast iron or steel.

Particularly preferably, at least some of the ducts lead into openings in the wheel flange, which penetrate the wheel flange. In this fashion, the air passage openings increase the air flow at the wheel hub in a simple manner and "suction" the ambient air through the ducts during the rotation of the wheel hub.

Other objects, advantages and novel features of the present invention will become apparent from the following detailed description of the invention when considered in conjunction with the accompanying drawings.

BRIEF DESCRIPTION OF THE DRAWINGS

FIGS. 8 to 11 are views of wheel hubs and brake disks according to the state of the art.

DETAILED DESCRIPTION

Figure 1:
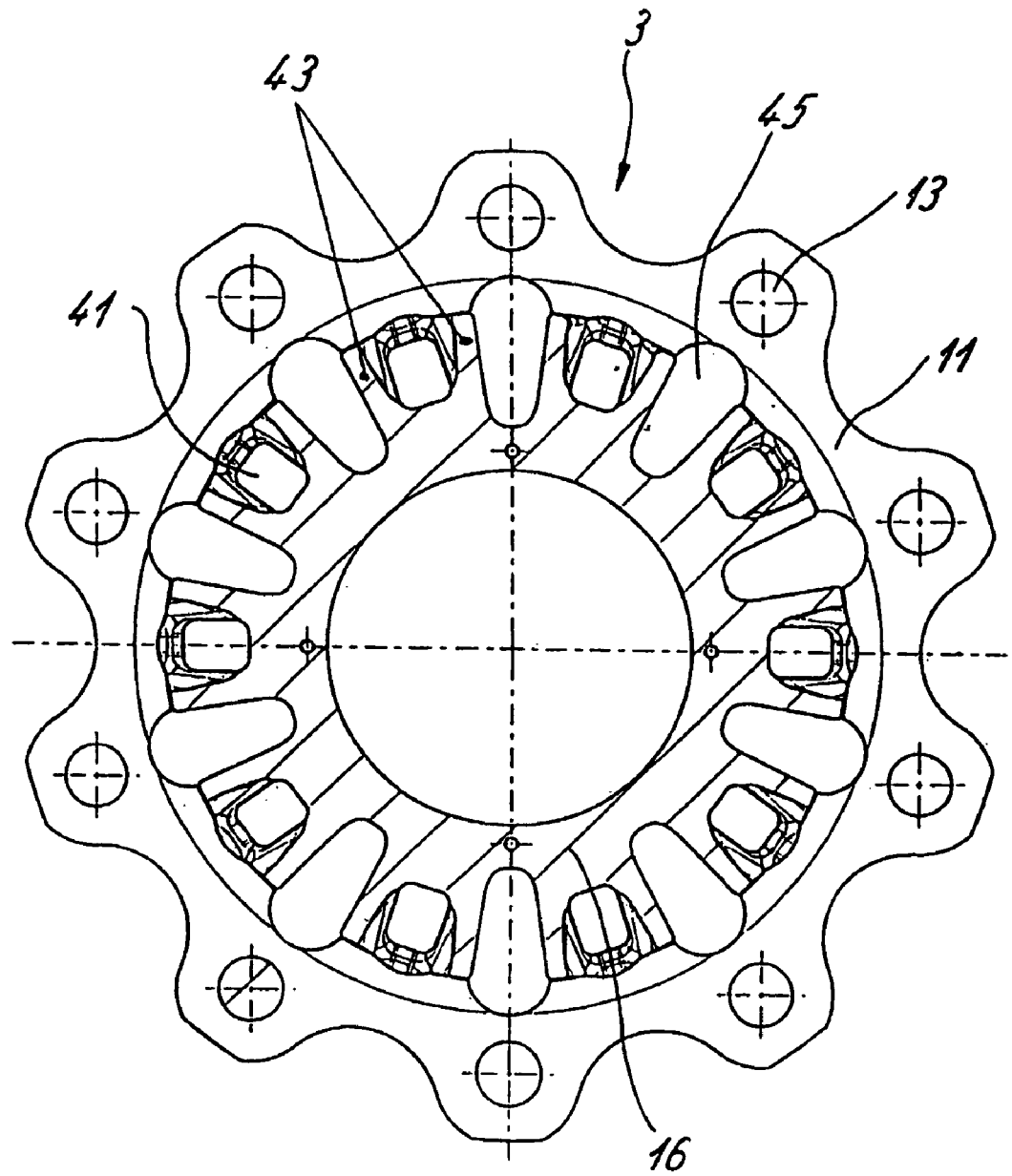
FIG. 1 is a lateral view of a wheel hub according to an embodiment of the invention.
Figure 2:
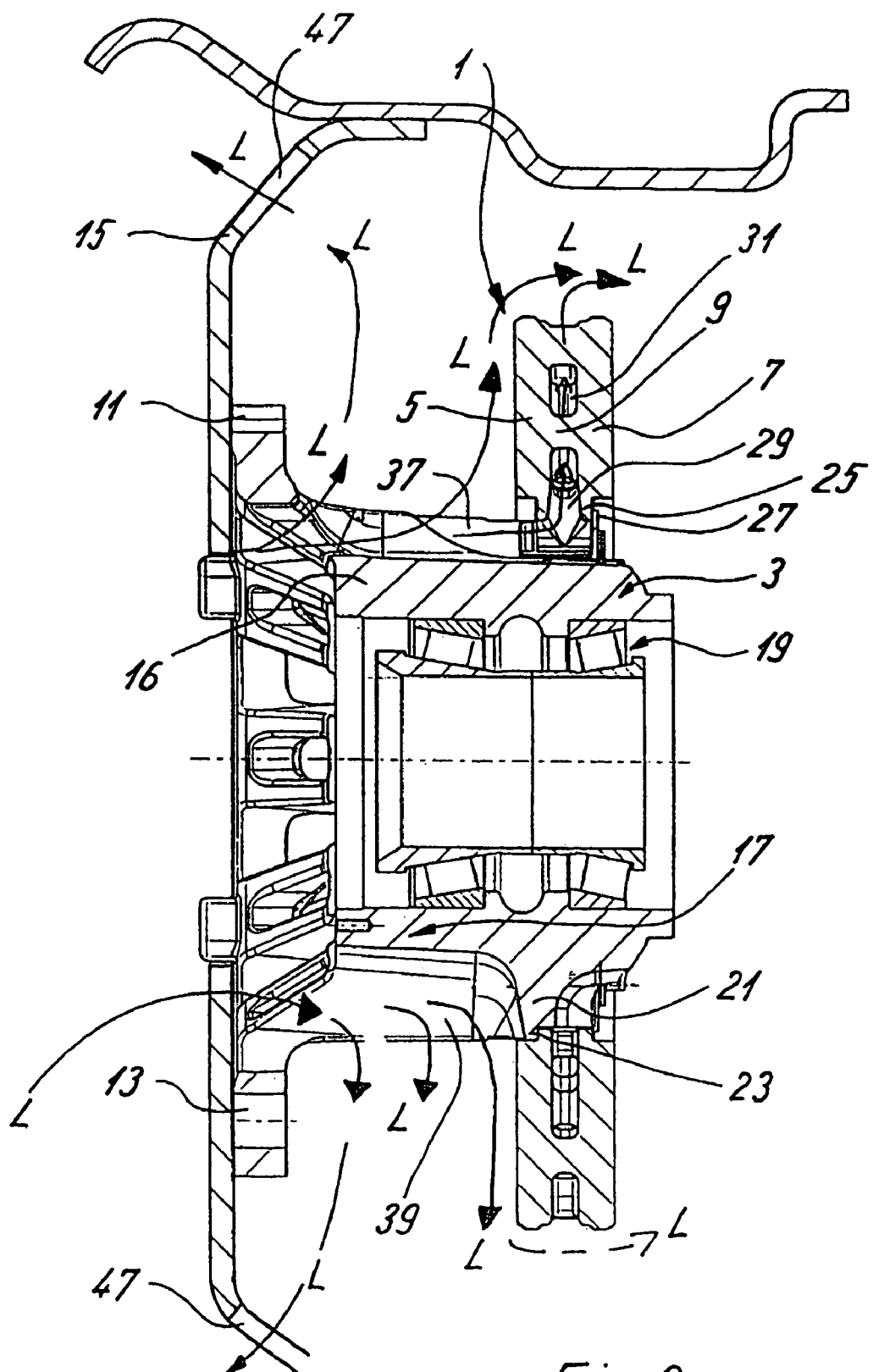
FIG. 2 is a sectional view of the wheel hub from FIG. 1, in addition to a sectional view of parts of a wheel disk and a rim and a brake disk.
Figure 3:
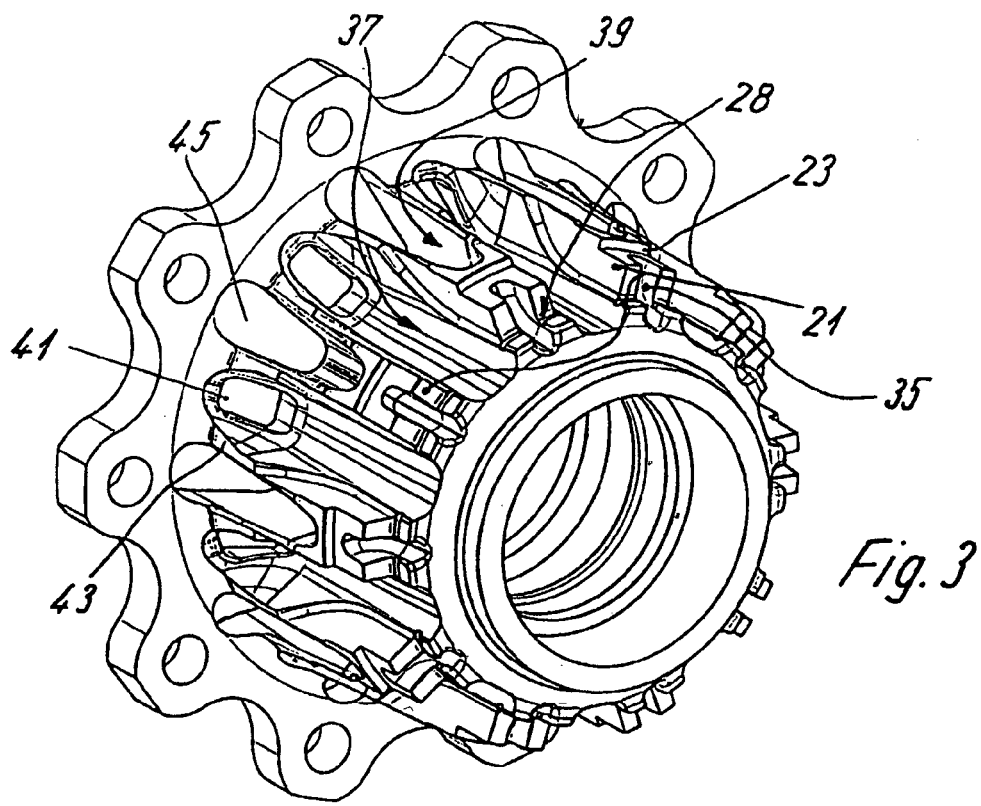
FIGS. 3 and 4 are different perspective views of the wheel hub of FIG. 1.

The internally ventilated brake disk 1 illustrated in FIG. 2 has two friction rings 5, 7 which are mutually connected by way of webs 9.

In contrast, the wheel hub 3 with the hub body 16 according to FIGS. 1 to 5 has an integrated wheel flange 11 with bores 13 for bolts (not shown here), by means of which the wheel hub 3 can be screwed to a wheel disk 15. The wheel flange 11 is adjoined by a hollow-cylindrical neck section 17 which is connected in one piece with the wheel flange 11—and slightly tapers here—and which, at its end facing away from the wheel flange 11, is placed with its interior circumference on a wheel bearing arrangement 19 which, in turn, can be placed on a shaft which is not shown here. At its end facing away from the wheel flange, the outer circumference of the neck section 17 is constructed such that the brake disk 1 can be placed thereon. For this purpose, the neck section 17 has cams 21 on its outer circumference, which cams 21 have one collar 23 respectively at one of their axial ends in their exterior circumferential area.

Furthermore, the brake disk 1 has radially inwardly projecting teeth 25 on the interior circumference of the friction rings, which teeth 25 engage between the cams 21 of the wheel hub 3, so that the interaction of the cams 21 and the teeth 25 in the circumferential direction ensures the supporting of the braking forces between the brake disk 1 and the wheel hub 3. In an axial direction, the collar 23 secures the brake disk 1 on the cams 21 of the wheel hub 3. In the opposite axial direction, the brake disk 1 can be secured, for example, by means of a snap ring 27, which can be inserted into a surrounding groove 28 of the wheel hub or by means of bolts and/or by means of intermediate elements 30 (also for reducing the heat transmission between the disk and the hub; see FIG. 5).

For cooling the brake disk 1, in addition to its internally ventilated layout, an air supply is used at the interior circumference of the brake disk. For this purpose, the brake disk has air ducts 29 which, among other things extend radially from the interior through the teeth 25 into the air duct 31 between the friction rings 5, 7. Axial openings 33 (FIG. 5) in the teeth 25, which lead into the air ducts 29, can further optimize the air supply. In addition, for improving the feeding of air into the air duct 31 of the brake disk 1, the cams 21 of the wheel hub 3 have recesses/ducts 35 which are axially open toward the side of the cams 21 and which toward the outside or in the radial direction lead to the outside in the air duct 31 of the brake disk 1, which in turn improves the air supply from the environment through the cams 21 of the hub into the internally ventilated brake disk.

For improving the cooling 3 of the wheel hub, its geometry was simultaneously optimized in multiple manners. Thus, for enlarging the surface—and therefore for intensifying the energy discharge to the ambient air—the surface at the outer circumference of the wheel hub 3 was enlarged, specifically in the area of the neck section 17 and, specifically particularly in the axial area of the neck section adjoining the cams 21 of the wheel hub 3, particularly in the area of the neck section 17 between the cams 21 of the wheel hub 3 and the wheel flange 11.

Thus, the neck section has a number of axially extending ducts 37, 39, the ducts 37 starting between the cams 21 of the wheel hub 3 and then extending in a groove-type manner axially at the outer circumference of the additional neck section 17. They lead into the air supply in openings 41 which optimize the area of the wheel hub 41, which openings 41 penetrate the wheel flange.

Two ribs 43 respectively, which extend over the area between the actual cams 21 and the wheel hub 3, were molded to the cams 21 in the area of the neck section 17, in which case the ducts 39 form between the ribs 43. The ducts 39 also lead into openings 45 which penetrate the wheel flange 11. As a supplement/alternative (not shown here), it is also conceivable to construct, instead of the open ducts 39, bores in the neck section 17 which extend through the wheel flange toward the outside.

As a result, a wheel hub/brake disk combination is created which has a flat tooth-linked brake disk 1, in the case of which the exposed wheel hub surface is utilized in the sense of an improved heat dissipation from the wheel hub 3 and the wheel disk 1. Thus, in an uncomplicated manner, the thermal stressing of the wheel hub 3 is reduced and a thermal overloading is avoided. By the lowering of the wheel hub temperatures, the use of light-weight materials as the wheel hub material also becomes possible.

In FIG. 2, the cooling air flows are indicated purely schematically by means of arrows L. In particular, an air flow is created through the openings 41 and the openings 45 past the ribs 43 in the direction of the brake disk 1 which, on the one hand, leads to a cooling of the wheel hub 3 and furthermore also leads to an additional cooling of the brake disk surface at least on the side of the brake disk pointing to the wheel disk 15. Through further openings 47 in the wheel disk, a portion of the heated air can escape around from the space around the wheel hub 3.

According to FIGS. 1 to 7, the ribs 43 or webs are arranged and designed such that, when the wheel hub 3 rotates, they generate an air circulation in the sense of a radial fan. Furthermore, as a result of the design of the air inlet openings and of the air ducts formed between the ribs or webs, the air flow is guided such that fresh air enters from the environment of the vehicle wheel from the exterior side of the wheel flange 11 through the air inlet openings 41, 45 into the area between the ribs 43 or webs, that the entering air is transported through the ribs 43 radially to the outside while the wheel hub 3 is rotating; then the radially flowing-out air sweeps over the brake disk surfaces, and finally escapes through the openings 47 in the wheel disk 15 of the vehicle wheel to the outside and/or by way of the outside diameter of the brake disk is transported to the interior side of the vehicle wheel.

Instead of an essentially axial alignment of the ducts 37, 39, these can also be aligned, for example, diagonally or sloped with respect to the wheel axle (not shown).

Figure 7:
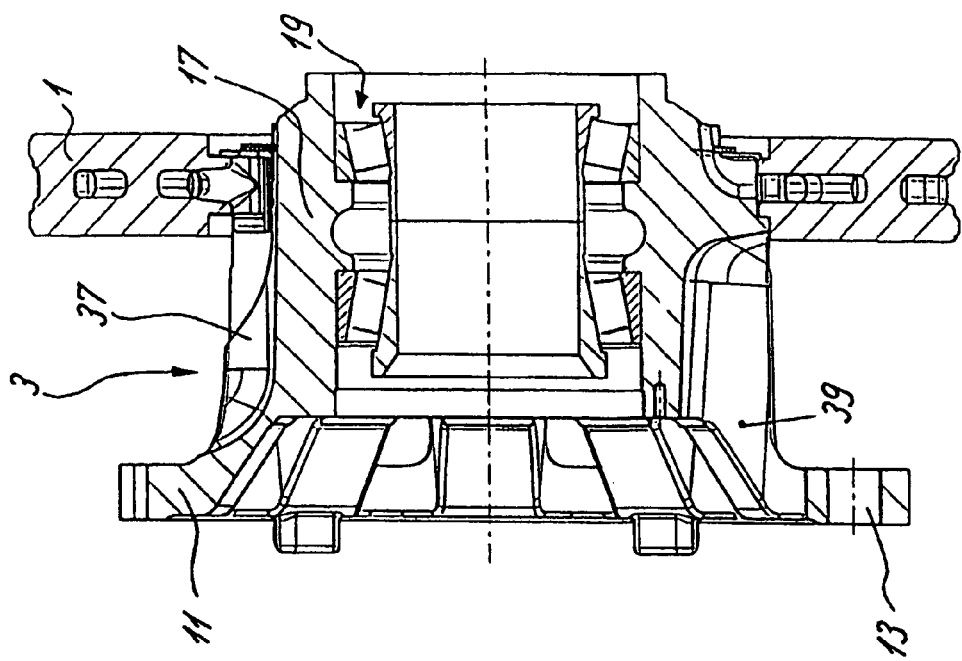
FIG. 7 is a sectional view of the wheel hub of FIG. 6 and a sectional view of the pertaining brake disk.
Figure 6:
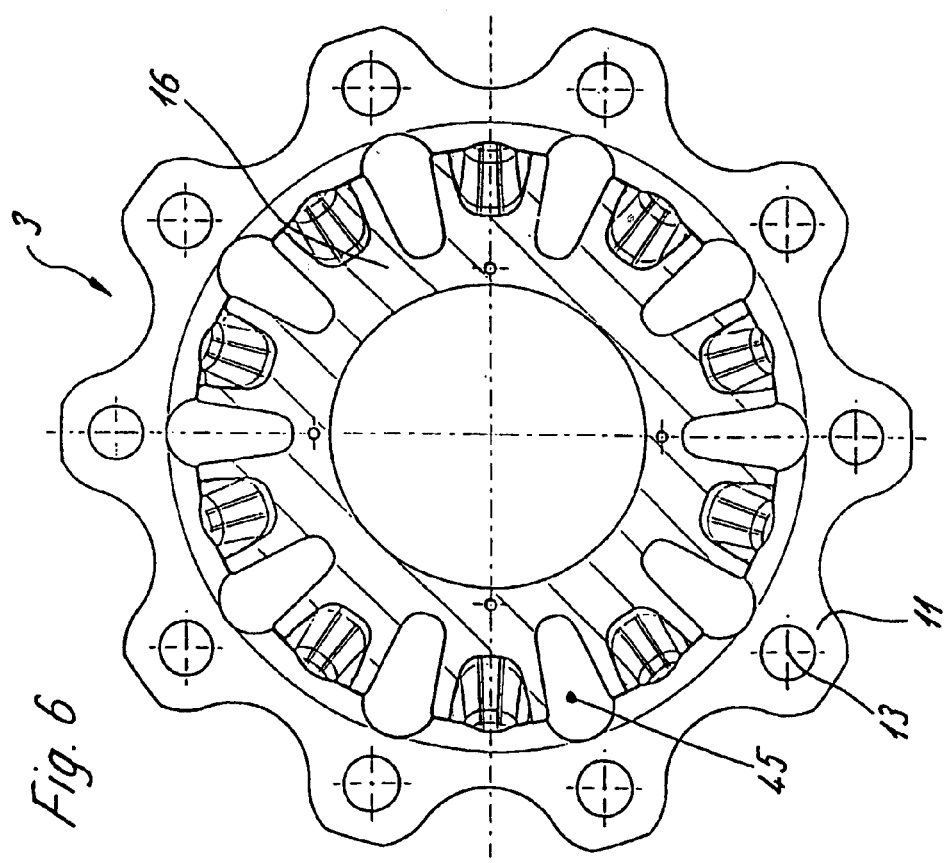
FIG. 6 is a lateral view of another wheel hub according to another embodiment of the invention.
Figure 11:
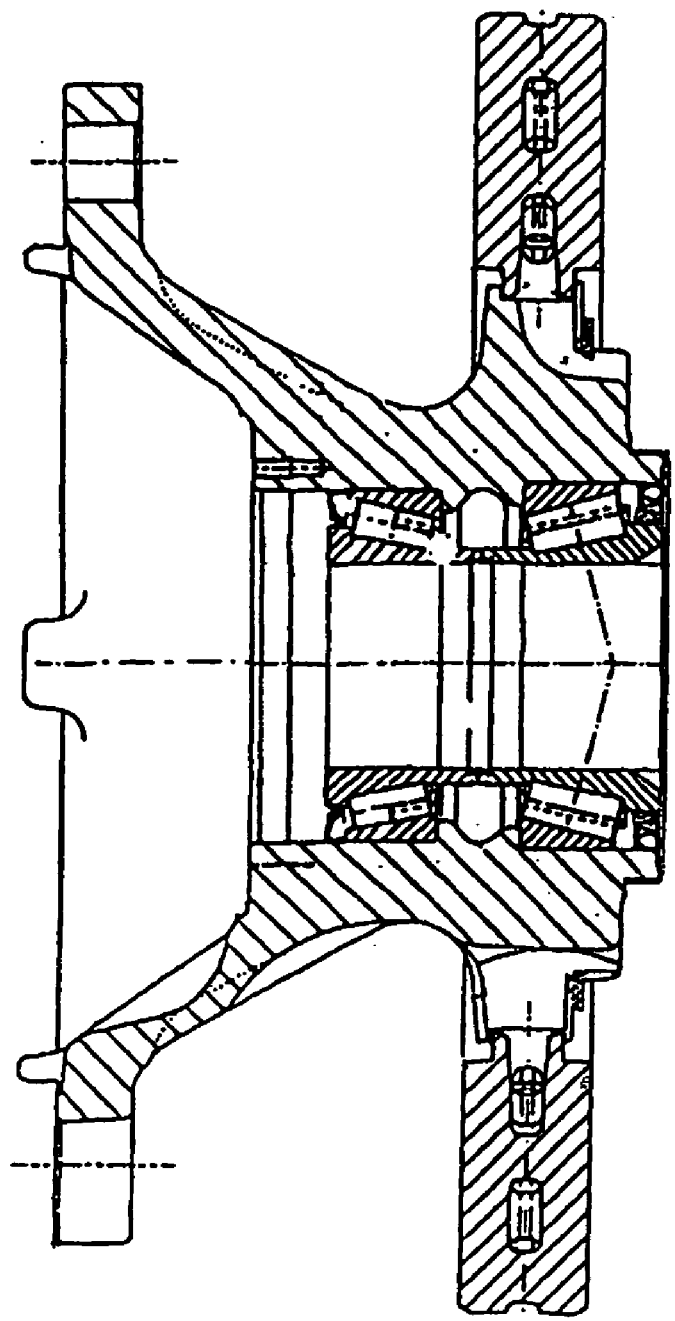

FIGS. 6 and 7 show a variant of the wheel hub, in the case of which the wheel flange only has air inlet openings 41 into the air ducts 37 behind the brake disk teeth 25 but no additional air inlet openings 45 into the ducts behind the cams 21. This embodiment may make sense where a particularly high load-bearing capacity of the wheel flange 3 is to be achieved.

Figure 4:
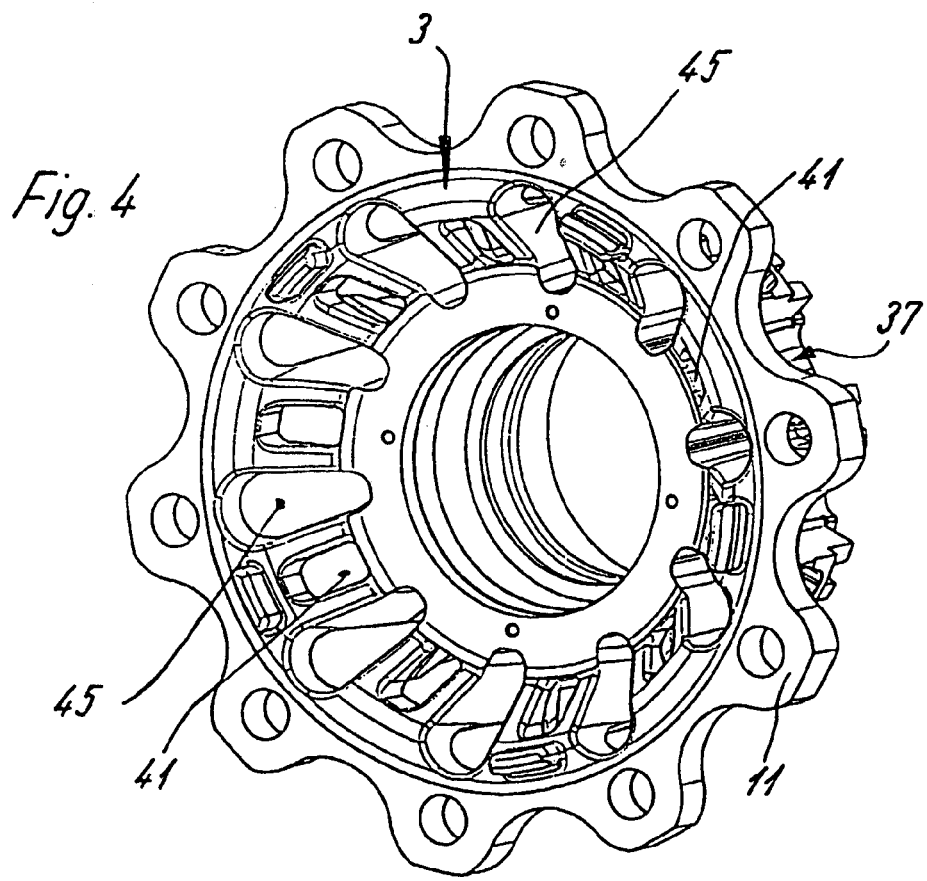
Figure 5:
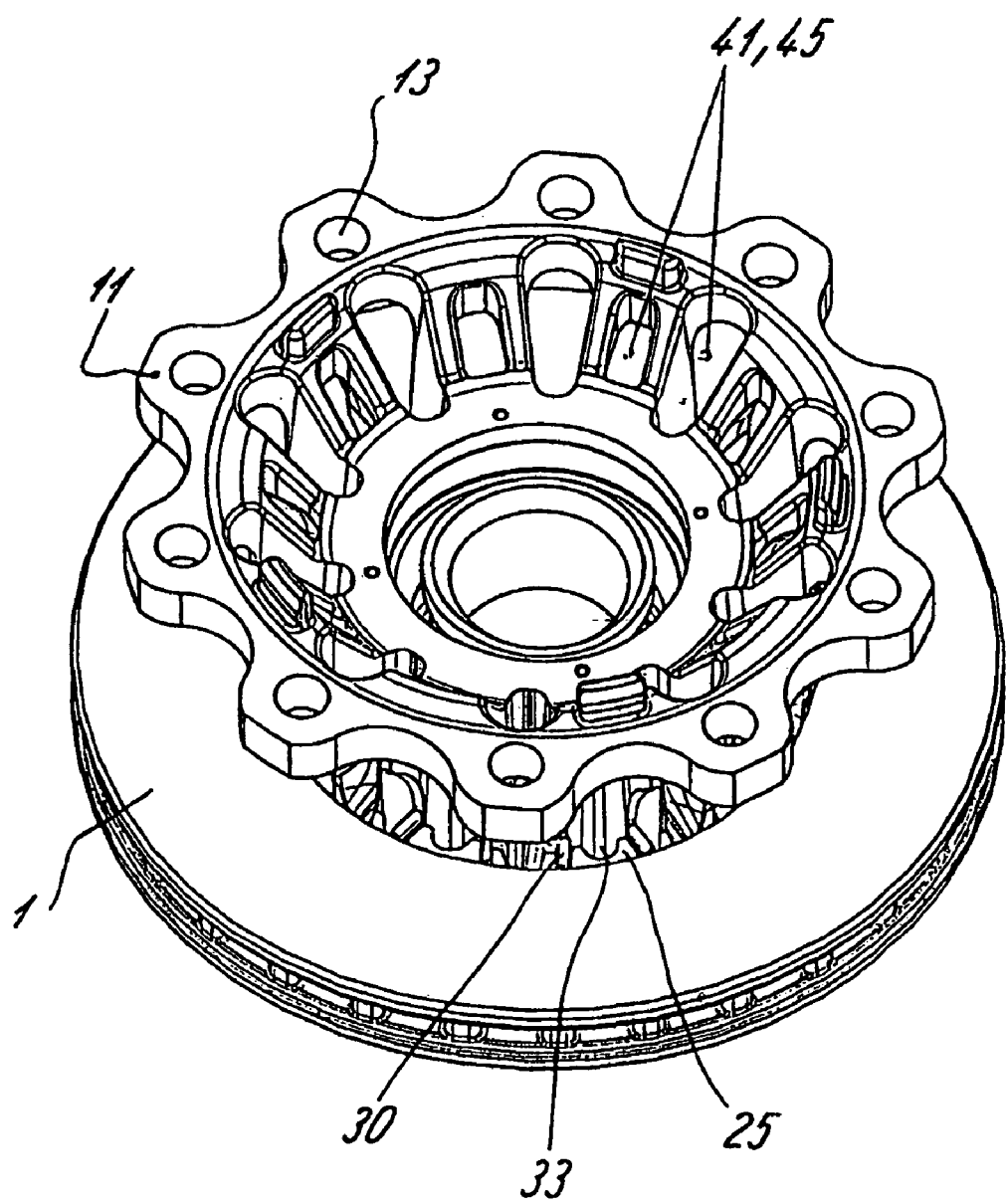
FIG. 5 is a perspective view of the wheel hub of FIG. 1 in addition to the brake disk placed thereon.

As a result of the selected design of the hub body, the undercuts behind the hub teeth existing in the construction according to FIG. 4 are eliminated, so that, when the casting is produced, external cores or lateral slides are not necessary, and the hub body (essentially the neck section 17) and therefore be produced in a simple and cost-effective manner.

The hub body can be produced from cast iron materials, such as a nodular cast iron, customary for wheel hubs. Because of the reinforcing shaping as well as the good cooling conditions, a light-weight material can also be used.

Preferably a thermoset aluminum cast alloy (preferably a GK Al Si 7 Mg wa or a GK Al Si 10 Mg wa) can be used as a light-weight material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wheel hub for receiving a brake disk, having a hub body which is molded to a wheel flange and has a neck section designed for receiving the brake disk, the neck section, in an axial area adjoining an area for the placing of the brake disk, being provided with ribs which extend essentially in an axial direction in an outer circumference of the neck section and ducts formed between the ribs,
wherein the outer circumference of the neck section has cams at an end of the neck axially most remote from the wheel flange, the cams each having a collar for axially securing the brake disk at said most remote end of the neck, each cam being molded to two of the ribs, the ribs extend over the area between the cams and the wheel flange, and a portion of the ducts starts between the cams of the wheel hub.

2. Wheel hub according to claim 1, wherein the ribs extend in an inclined manner with respect to an axis of rotation of the hub at the outer circumference of the neck section.

3. Wheel hub according to claim 1, wherein the ribs and the ducts extend to a wheel flange molded to the neck section.

4. Wheel hub according to claim 1, wherein the ducts between the ribs lead at least partially into openings which penetrate the wheel flange.

5. Wheel hub according to claim 4, wherein all ducts lead into the openings.

6. Wheel hub according to claim 1, wherein the wheel hub comprises a light metal.

7. Wheel hub according to claim 1, wherein the wheel hub comprises cast iron or steel.

8. Wheel hub according to claim 1, wherein the neck section is adapted to be placed onto a wheel bearing arrangement designed for accommodating an axle.

9. A wheel hub for receiving a brake disk, comprising:
a hub body, the hub body including a wheel flange and a neck section adapted to receive the brake disk, wherein
a plurality of axial ribs are disposed on an outside circumferential surface of the neck section parallel to an axis of rotation of the hub body,
a plurality of cams are disposed radially about an end of the neck section opposite a wheel flange end, each cam formed with at least two of the ribs and having a collar adapted to arrest axial motion of the brake disk toward the wheel flange,
each of the ribs which is formed with a cam extends between its cam and the wheel flange, and
a plurality of ducts penetrate the wheel flange, each duct being aligned and communicating with a corresponding gap between two of the plurality of ribs.

10. The wheel hub of claim 9, wherein a height of the ribs above the outer circumference of the neck section varies between the brake disk end and the wheel flange end.

11. The wheel hub of claim 9, wherein the wheel flange is integrally formed with the neck section.

12. The wheel hub of claim 9, wherein the hub body is formed from a light metal.

13. The wheel hub of claim 9, wherein the hub body is formed from one of cast iron and steel.

14. The wheel hub of claim 9, wherein the neck section is adapted to receive a wheel bearing arrangement for mounting on an axle.

* * * * *